US011942887B2

(12) United States Patent
Faedo et al.

(10) Patent No.: US 11,942,887 B2
(45) Date of Patent: Mar. 26, 2024

(54) DUAL SEGMENTED MOTOR DRIVE

(71) Applicant: DANA TM4 ITALIA S.R.L., Vicenza (IT)

(72) Inventors: Walter Faedo, Vestenanova (IT); Federico Lovato, Verona (IT)

(73) Assignee: DANA TM4 ITALIA S.R.L., Arzignano (IT)

( * ) Notice: Subject to any disclaimer, the term of this patent is extended or adjusted under 35 U.S.C. 154(b) by 174 days.

(21) Appl. No.: 17/457,388

(22) Filed: Dec. 2, 2021

(65) Prior Publication Data

US 2023/0179137 A1 Jun. 8, 2023

(51) Int. Cl.
| | |
|---|---|
| H02P 6/28 | (2016.01) |
| H02K 3/12 | (2006.01) |
| H02K 3/28 | (2006.01) |
| H02M 7/493 | (2007.01) |
| H02P 27/08 | (2006.01) |
| H02P 29/024 | (2016.01) |
| H02P 29/028 | (2016.01) |

(52) U.S. Cl.
CPC ............. *H02P 29/028* (2013.01); *H02K 3/12* (2013.01); *H02K 3/28* (2013.01); *H02M 7/493* (2013.01); *H02P 27/08* (2013.01); *H02P 29/027* (2013.01)

(58) Field of Classification Search
CPC ...... H02P 29/028; H02P 27/08; H02P 29/027; H02P 25/18; H02P 25/22; H02K 3/12; H02K 3/28; H02K 3/18; H02M 7/493
See application file for complete search history.

(56) References Cited

U.S. PATENT DOCUMENTS

| | | | | |
|---|---|---|---|---|
| 7,277,304 | B2 | 10/2007 | Stancu et al. | |
| 9,853,570 | B2 | 12/2017 | Maly | |
| 11,588,393 | B2* | 2/2023 | Pasterczyk | H02M 1/126 |
| 2014/0111066 | A1* | 4/2014 | Ito | H02K 11/33 |
| | | | | 310/198 |
| 2015/0061607 | A1* | 3/2015 | Pan | H02P 25/22 |
| | | | | 322/27 |
| 2015/0349626 | A1* | 12/2015 | Jiang | H02M 7/44 |
| | | | | 363/39 |
| 2017/0237377 | A1* | 8/2017 | Furukawa | H02P 29/028 |
| | | | | 318/564 |
| 2018/0091081 | A1* | 3/2018 | Suzuki | H02P 6/28 |
| 2018/0127023 | A1* | 5/2018 | Füzes | B62D 5/0484 |
| 2019/0023315 | A1* | 1/2019 | Takizawa | B62D 5/0484 |
| 2020/0052638 | A1* | 2/2020 | Kinjo | H02P 25/20 |
| 2020/0083826 | A1* | 3/2020 | Woo | B62D 5/046 |
| 2020/0177113 | A1* | 6/2020 | Suzuki | B62D 5/046 |
| 2020/0366232 | A1* | 11/2020 | Kinjo | H02P 27/06 |
| 2020/0373801 | A1* | 11/2020 | Kinjo | H02K 11/33 |
| 2020/0382040 | A1* | 12/2020 | Suzuki | B62D 5/0493 |

OTHER PUBLICATIONS

Chowdhury, S. et al., "Enabling Technologies for Compact Integrated Electric Drives for Automotive Traction Applications," Proceedings of the 2019 IEEE Transportation Electrification Conference and Expo (ITEC), Jun. 19, 2021, Detroit, Michigan, 8 pages.

* cited by examiner

Primary Examiner — Muhammad S Islam
(74) Attorney, Agent, or Firm — McCoy Russell LLP (57) ABSTRACT

A method and system for operating an electric machine are described. In one example, the system includes a motor stator having a first group of windings and a second group of windings. Each group of the windings is electrically coupled to a different inverter so that the system may have a layer of operational redundancy.

16 Claims, 6 Drawing Sheets

DUAL SEGMENTED MOTOR DRIVE

TECHNICAL FIELD

The present disclosure relates to a system and method for providing redundancy to electro-mechanical systems. The method and system may be directed to electro-mechanical systems that are operated via motors.

BACKGROUND AND SUMMARY

Electro-mechanical devices may adjust positions of mechanisms to improve system operation or to control a system. The electro-mechanical devices may include electric machines (e.g., synchronous motors, asynchronous motors, induction motors, DC motors, solenoids, etc.) that are commanded to states or positions via a controller. Some electro-mechanical devices may operate with a higher level of priority and it may be desired that these electro-mechanical devices operate with a higher level of robustness. One way to improve robustness of a first electro-mechanical device may be to operate a similar electro-mechanical device as a follower of the first electro-mechanical device. For example, a first electric motor that adjusts a position of a mechanism may be supported by a second electric motor that operates at a same time as the first electric motor to assist the first electric motor. If the first electric motor does not operate as expected, the second electric motor may compensate such that the mechanism may continue to operate as may be expected. While a second electric machine may be beneficial to continue operation of the mechanism, cost of the second electric machine may increase system cost more than may be desired.

The inventors herein have recognized the above-mentioned issues and have developed an electric machine, comprising: a stator; windings for one or more electric power phases wrapping the stator, the windings being segmented into a first half and a second half, windings included in the first half not electrically coupled to windings included in the second half.

By building an electric machine that includes a stator with windings in a first half and windings in a second half that at least partially wrap the stator; it may be possible to provide redundant electric machine operation. In particular, windings of first half may be supplied with electric current from a first inverter and windings of the second half may be supplied with electric current from a second inverter. The first and second windings alone or in combination may cause a rotor to rotate when electric current flows through the windings. Consequently, if the switches in the first or second inverter do not operate as expected, the rotor may continue to rotate from torque generated by flowing electric current through the windings that are supplied by the other inverter.

The present description may provide several advantages. In particular, the system and method described herein may provide a redundant electric system. In addition, the approach may reduce system mass and cost. Further, the approach may reduce the size of an electric system so that the electric system may be provided in a smaller package.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
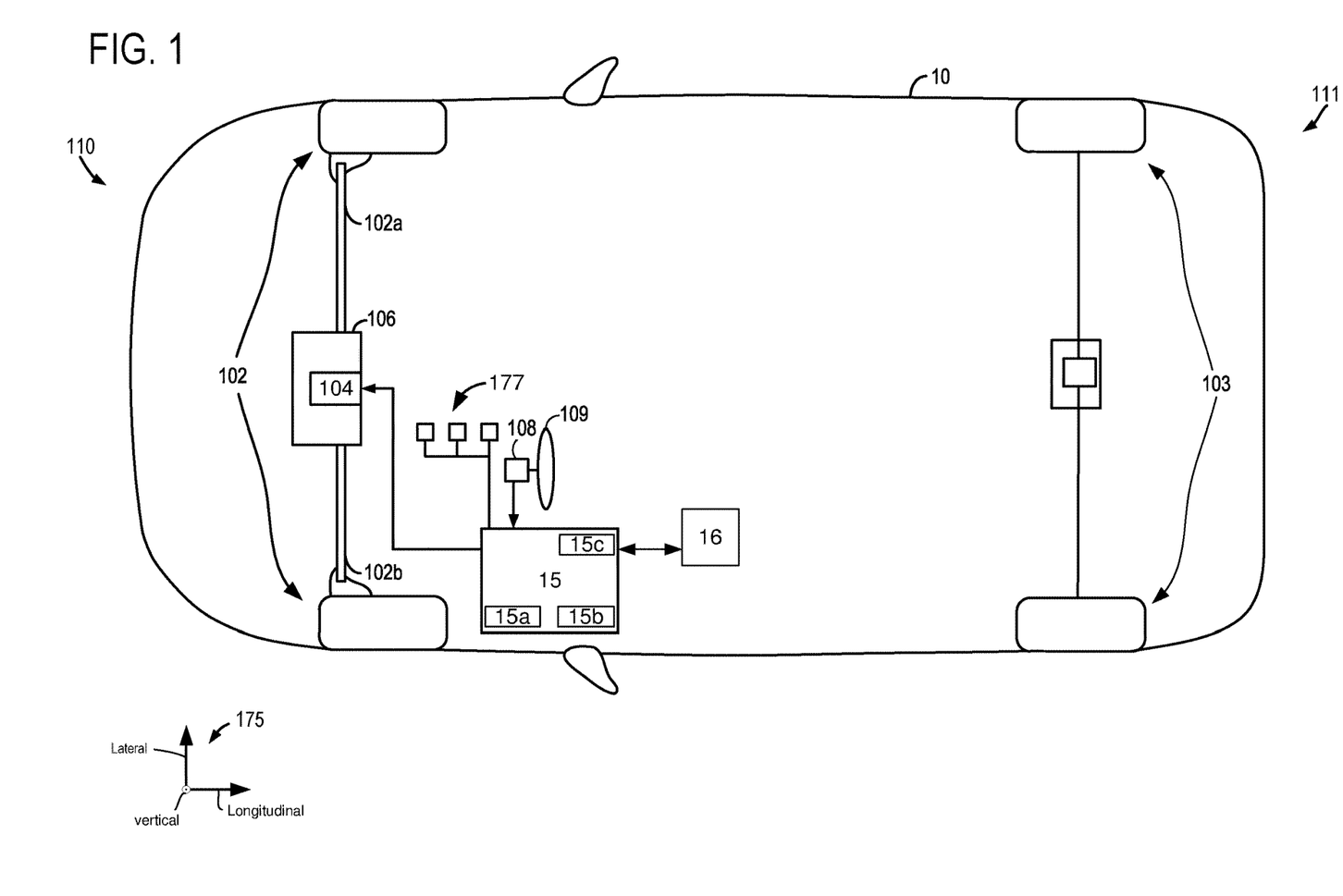
FIG. 1 is a schematic diagram of an example dual segmented motor and drive included in a vehicle is shown.
Figure 2:
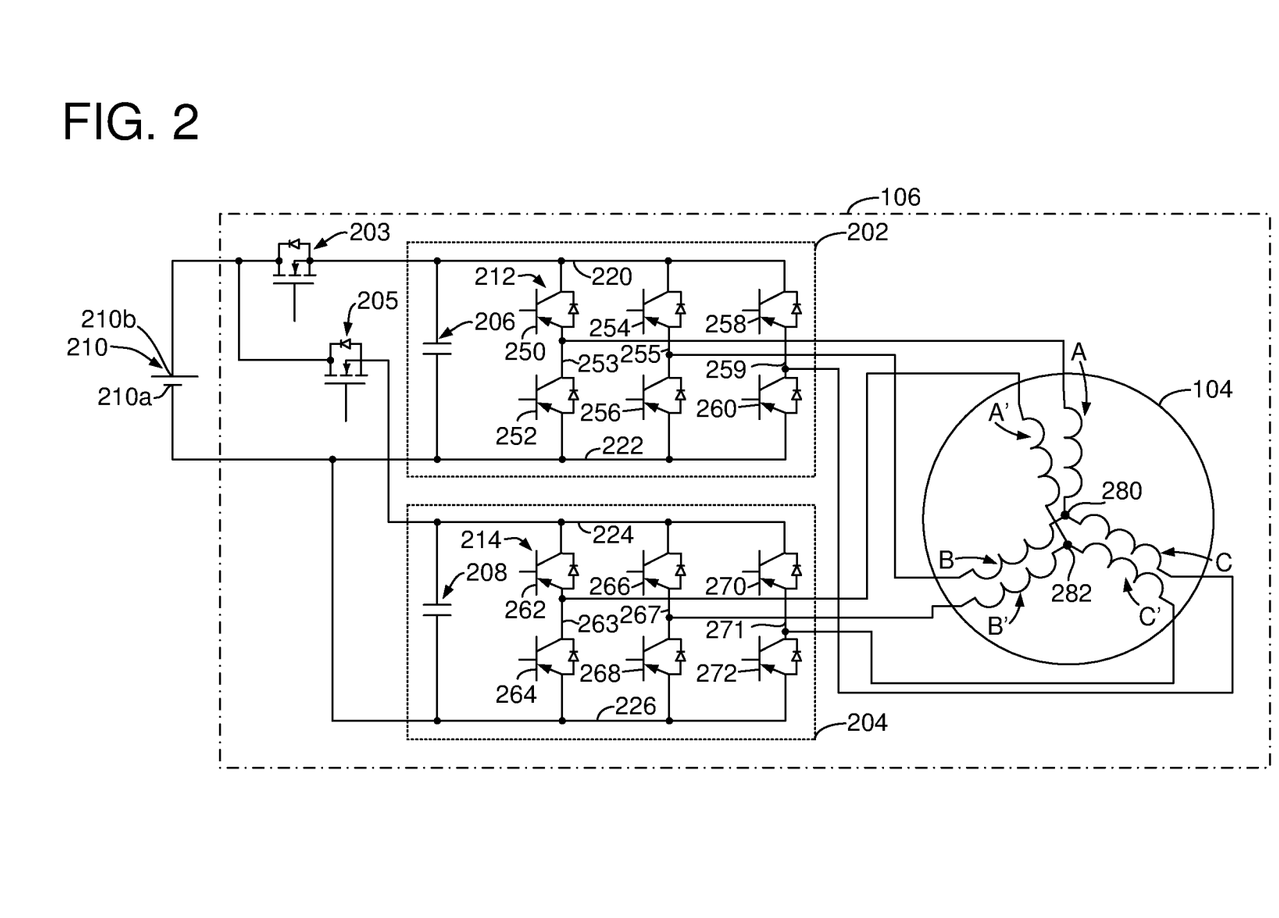
FIG. 2 a schematic view of a dual segmented motor and its inverters is shown.
Figure 3A:
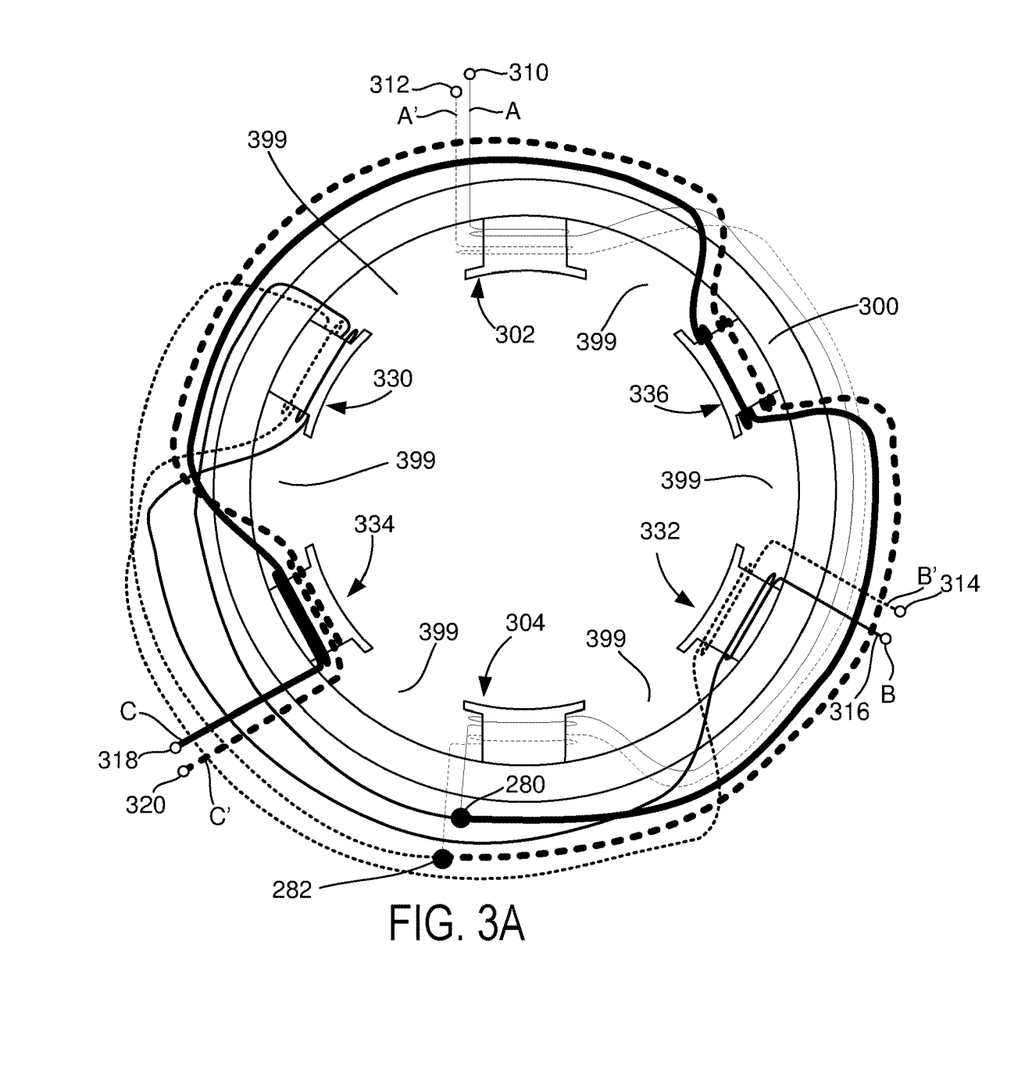
FIG. 3A shows a cross section of a portion of an example dual segmented motor.
Figure 3B:
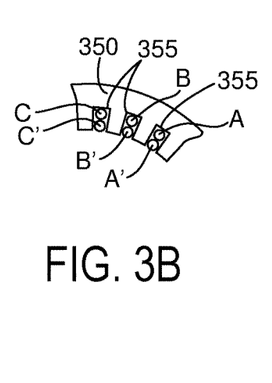
FIG. 3B shows a cross section of a portion of a second example dual segmented motor.
Figure 4:
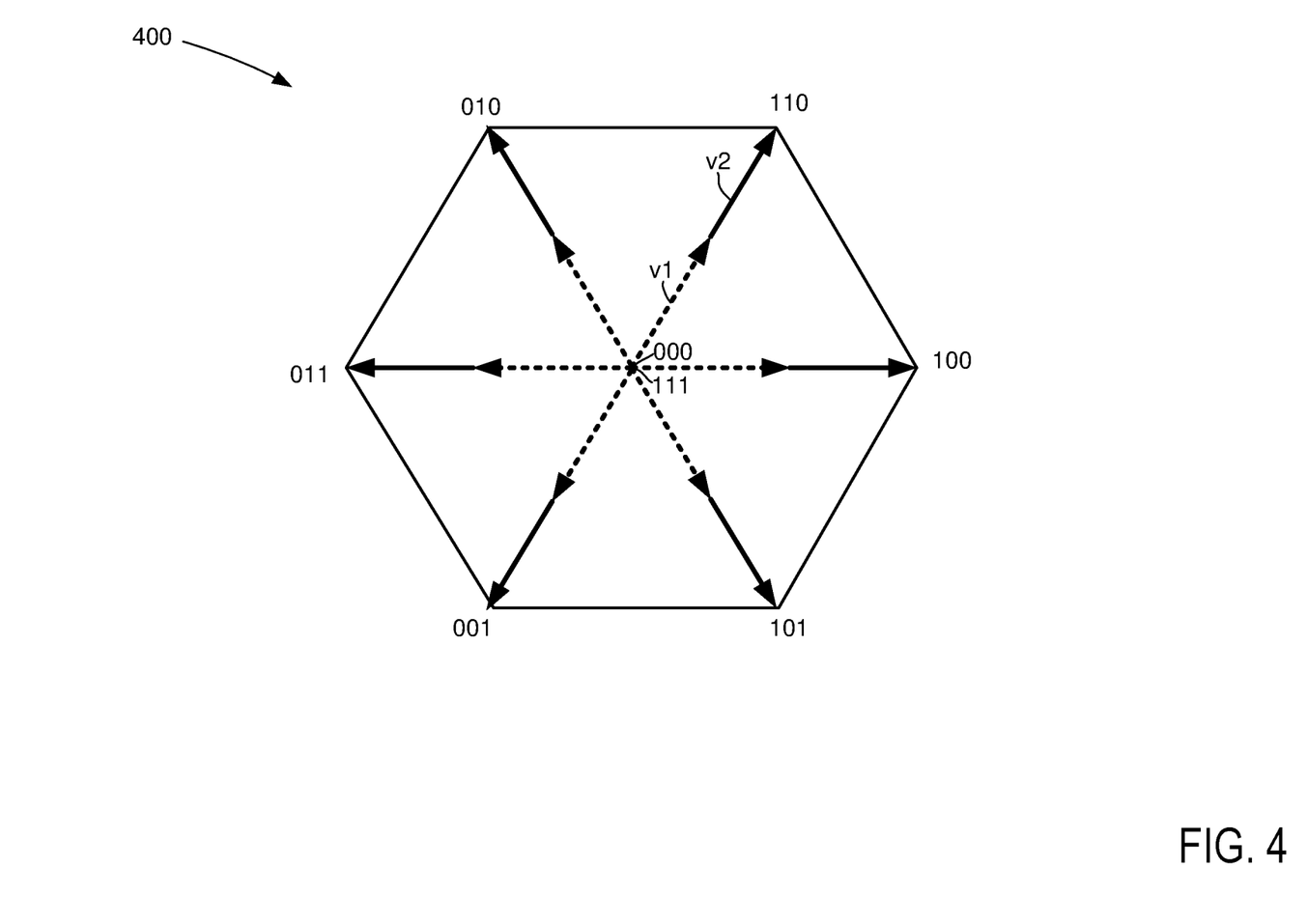
FIG. 4 shows a space vector hexagon for a dual segmented motor that is operated using pulse width modulation.
Figure 5:
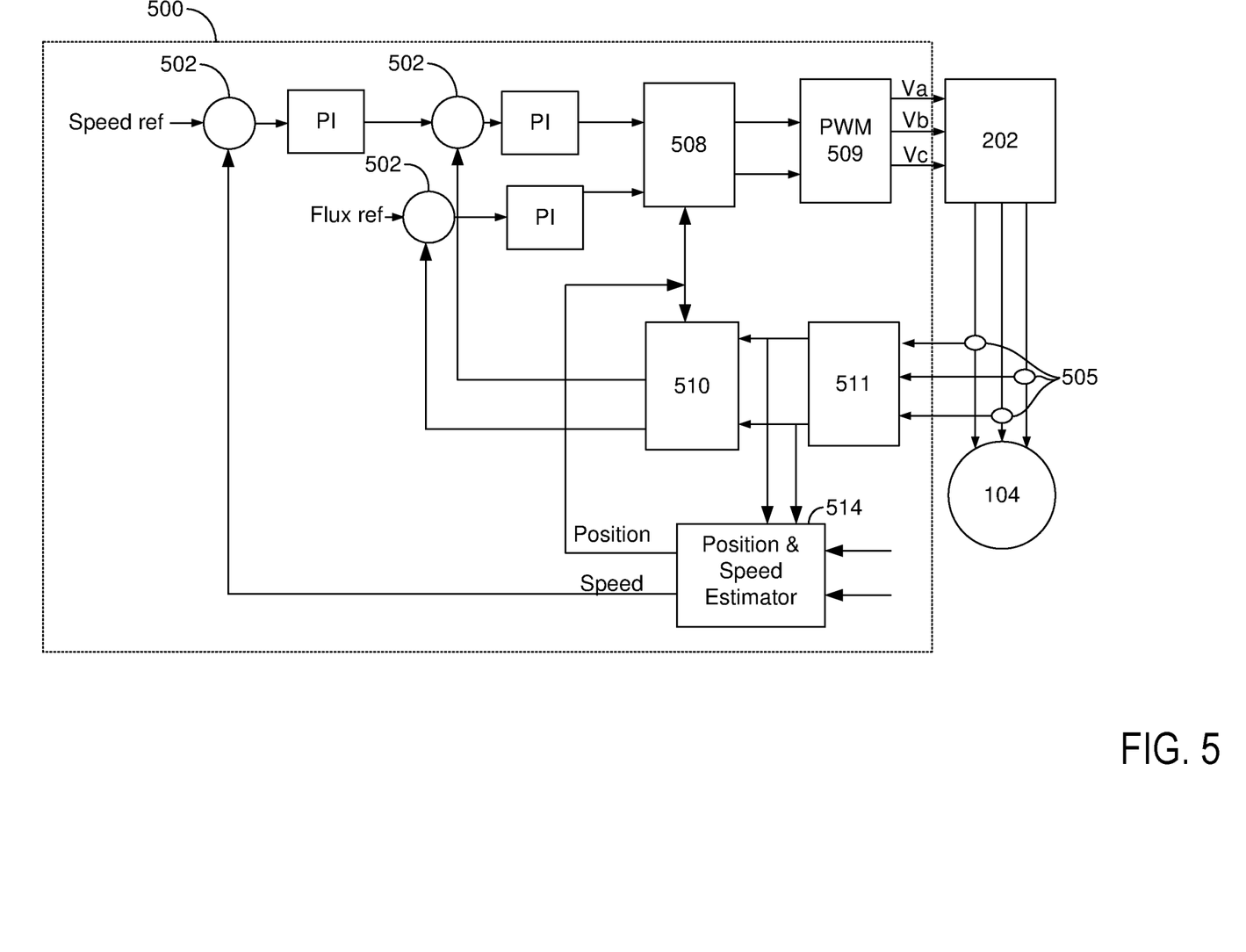
FIG. 5 shows a block diagram of a one half of a field oriented control scheme for a dual segmented motor.
Figure 6:
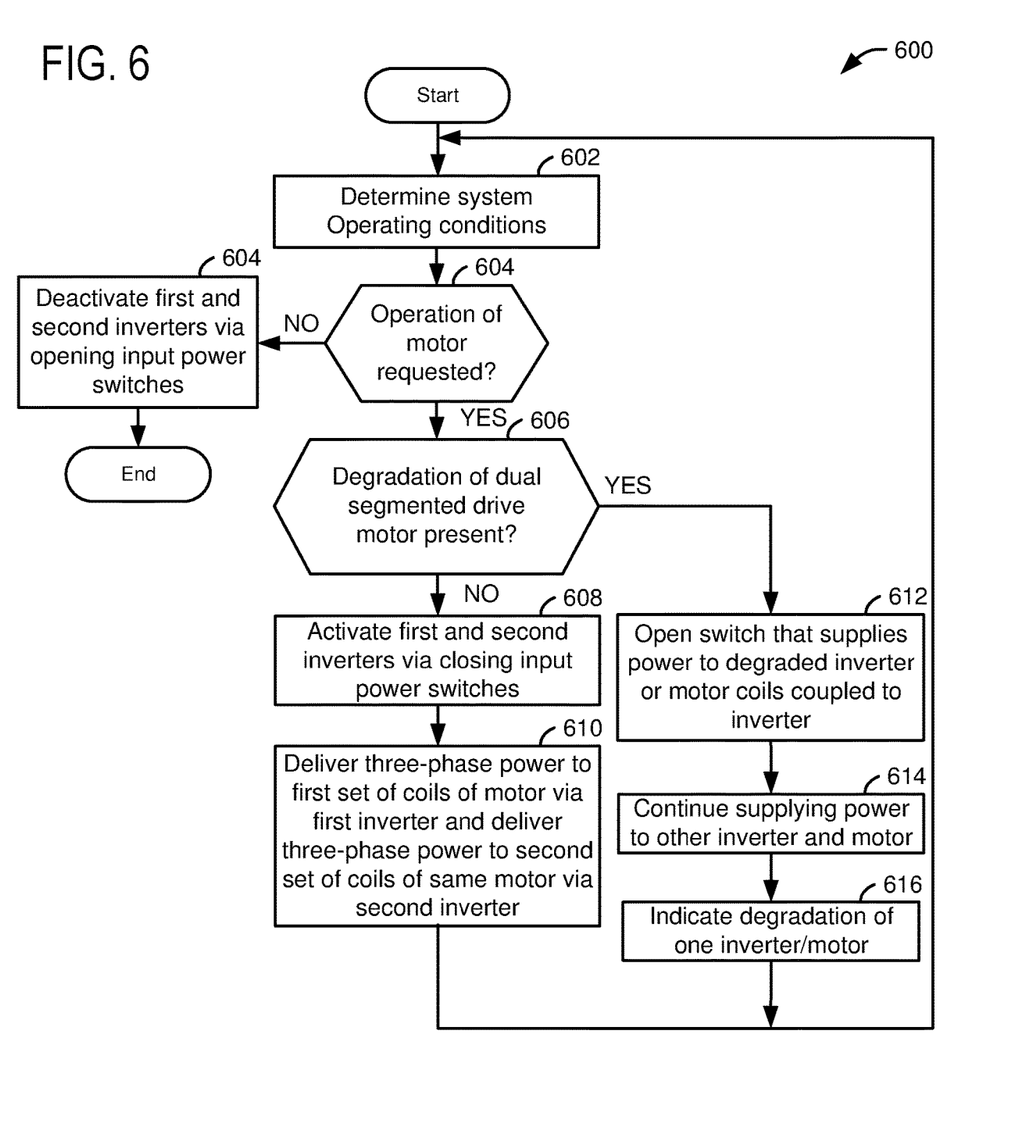
FIG. 6 shows a flowchart of a method for operating a dual segmented motor and drive.

The following description relates to systems and methods for operating an electric machine. The electric machine may be part of a vehicle, aircraft, or other system. FIG. 1 shows one example where the system and methods may be included in a vehicle. FIGS. 2-3B show example system configurations for a dual segmented motor drive. A space vector hexagon that shows how voltages may be supplied to the dual segmented motor drive is shown in FIG. 4. The dual segmented motor may be controlled via a field oriented control scheme as shown in FIG. 5. Finally, a flowchart of a method for controlling a dual segmented motor drive is shown in FIG. 6. While the dual segmented motor drive is described herein, the approach may be applied to other electric machines as well, such as solenoids.

FIG. 1 shows an example vehicle 10 that includes a dual segmented motor drive 106. In this example, the dual segmented motor drive 106 is applied to operate vehicle steering; however, it may be deployed for other uses including, but not limited to braking actuators, propulsion motors, transmission shifting actuators, and throttle actuators.

In this example, vehicle 10 includes a front side 110 and a rear side 111. Front side 110 includes front wheels 102, which may articulate right and left via shafts 102a and 102b. Shafts 102a and 102b may be moved to the right or left via dual segmented motor drive 106. Dual segmented motor drive 106 includes an electric motor 104. Controller 15 may operate dual segmented motor drive 106 by sending control signals to activate and deactivate transistors and other electrical components that are included in dual segmented motor drive 106. Controller 15 includes read-only (non-transitory memory) 15a, a processor 15b, and random access memory 15c. Controller 15 may provide command signals to duel segmented motor drive in response to input received from position sensor 108. Position sensor 108 may be coupled to steering wheel 109 to sense a position of steering wheel 109. Controller 15 may also receive input from sensors 177, which may include electric current sensors, battery voltage sensors, vehicle speed sensors, ambient temperature sensors, etc. Controller 15 may receive input and provide status information to human/machine interface 16. Human/machine interface 16 may be a touch screen, pushbuttons, or other known human/machine interfaces.

In this example, rear wheels 103 are not steerable, but in other examples positions of rear wheels 103 may also be adjusted. Lateral, vertical, and longitudinal directions for vehicle 10 are indicated at 175.

Turning now to FIG. 2, a schematic view of a dual segmented motor drive 106 is shown. Dual segmented motor drive 106 includes a first inverter 202 for transforming direct current into alternating current and a second inverter 204 for transforming direct current into alternating current. The direct current may be supplied via power source 210 (e.g., a battery or a battery in combination with an alternator (not shown)). First inverter 202 and second inverter 204 may supply three phase electric power to electric machine 104 (e.g., an electric motor). Alternatively, inverters 202 and 204 may provide single phase AC to a single phase electric machine 104.

Dual segmented motor drive 106 is shown electrically coupled to positive terminal 210b of power source 210 and negative terminal 210a of power source 210. Switch or transistor 203 may selectively couple positive electric power rail 220 of first inverter 202 to positive terminal 210b of power source 210. Similarly, switch or transistor 205 may selectively couple positive electric power rail 224 of second inverter 204 to positive terminal 210b of power source 210.

First inverter 202 includes a capacitor 206 to reduce voltage ripple (e.g., changes in voltage level) to a voltage of positive electric power rail 220. First inverter 202 may be comprised of an array of transistors 212 that includes transistors that are electrically coupled in series and transistors that are electrically coupled in parallel. For example, transistor 250 is coupled in series with transistor 252 via conductor 253, and conductor 253 is an output of a first electrical power phase A for first inverter 202. Transistor 250 is also electrically coupled to positive electric power rail 220 and transistor 252 is electrically coupled to negative voltage rail 222. Transistor 254 is coupled in series with transistor 256 via conductor 255, and conductor 255 is an output of a second electrical power phase B for first inverter 202. Transistor 254 is also electrically coupled to positive electric power rail 220 and transistor 256 is electrically coupled to negative voltage rail 222. Transistor 258 is coupled in series with transistor 260 via conductor 259, and conductor 259 is an output of a third electrical power phase C for first inverter 202. Transistor 258 is also electrically coupled to positive electric power rail 220 and transistor 260 is electrically coupled to negative voltage rail 222. The transistors for electric power phases A, B, and C are arranged in parallel.

Second inverter 204 includes a capacitor 208 to reduce voltage ripple (e.g., changes in voltage level) to a voltage of positive electric power rail 224. Second inverter 204 may be comprised of an array of transistors 214 that includes transistors that are electrically coupled in series and transistors that are electrically coupled in parallel. In particular, transistor 262 is coupled in series with transistor 264 via conductor 263, and conductor 263 is an output of a first electrical power phase A' for second inverter 204. Transistor 262 is also electrically coupled to positive electric power rail 224 and transistor 264 is electrically coupled to negative voltage rail 226. Transistor 266 is coupled in series with transistor 268 via conductor 267, and conductor 267 is an output of a second electrical power phase B' for second inverter 204. Transistor 266 is also electrically coupled to positive electric power rail 224 and transistor 268 is electrically coupled to negative voltage rail 226. Transistor 270 is coupled in series with transistor 272 via conductor 271, and conductor 271 is an output of a third electrical power phase C' for second inverter 204. Transistor 270 is also electrically coupled to positive electric power rail 224 and transistor 272 is electrically coupled to negative voltage rail 226. The transistors for electric power phases A', B', and C' are arranged in parallel.

The capacitance values of capacitors 206 and 208 may be significantly smaller than for a system that provides redundancy via a second motor. This is because the ripple voltage of first inverter 202 and the ripple voltage of second inverter 204 may be substantially lower than for systems that supply electric power to a motor via a sole inverter.

Electric motor 104 includes windings that are segmented into two groups, in particular, a first group A, B, C and a second group A',B',C'. Windings of the two groups are not electrically coupled together when electric motor 104 is not coupled to one or more inverters. The first group of windings is electrically coupled to the first inverter 202 and the second group of windings is electrically coupled to the second inverter 204. Windings A, B, and C are electrically coupled together at node 280 such that windings A, B, and C are arranged in a "Y" configuration. Windings A', B', and C' are electrically coupled together at node 282 such that windings A', B', and C' are arranged in a "Y" configuration. Windings A and A' may occupy same slots in an armature of electric machine as shown in FIGS. 3A and 3B. Similarly, windings B and B' may occupy same slots in an armature of electric machine as shown in FIGS. 3A and 3B. Likewise, windings C and C' may occupy same slots in an armature of electric machine as shown in FIGS. 3A and 3B. Windings A may receive a first electric power phase from first inverter 202 via conductor 253. Windings B may receive a second electric power phase from first inverter 202 via conductor 255. Windings C may receive a third electric power phase from first inverter 202 via conductor 259. Windings A' may receive a first electric power phase from second inverter 204 via conductor 263. Windings B' may receive a second electric power phase from second inverter 204 via conductor 267. Windings C' may receive a third electric power phase from second inverter 204 via conductor 271.

Electric power phase B supplied from inverter 202 may be 120 electrical degrees out of phase with electric power phase A. Electric power phase C supplied from inverter 202 may be 120 electrical degrees out of phase with electric power phase B. Electric power phase B' supplied from inverter 204 may be 120 electrical degrees out of phase with electric power phase A'. Electric power phase C' supplied from inverter 204 may be 120 electrical degrees out of phase with electric power phase B'. Electric power phase A supplied from inverter 202 may be in phase with electric power phase A'. Electric power phase B supplied from inverter 202 may be in phase with electric power phase B'. Electric power phase C supplied from inverter 202 may be in phase with electric power phase C'.

Referring now to FIG. 3A, a cross section of a stator 300 for electric motor 104 is shown. In this example, stator 300 is configured as a two pole three phase stator. Poles 302 and 304 are wrapped by phase windings A and A'. Phase windings A and A' exit stator 300 at terminals 310 and 312. Poles 332 and 330 are wrapped by phase windings B and B'. Phase windings B and B' exit stator 300 at terminals 314 and 316. Poles 334 and 336 are wrapped by phase windings C and C'. Phase windings C and C' exit stator 300 at terminals 318 and 320. Slots 399 may be at least partially filled via windings A, A',B, B', C, and C'. In this example, the pole pairs are separated by 120 mechanical degrees, but in other examples, the pole separation may be less than 120 mechanical degrees as shown in FIG. 3B. The first segment of windings A, B, and C is tied together at node 280. The second segment of windings A', B', and C' is tied together at node 282. Thus, phase windings A and A' may be arranged together so that both the first and second inverters may simultaneously provide electric current to induce rotation of a rotor (not shown) within stator 300 via common poles. Likewise, phase windings B and B' may be arranged together to induce rotation of the rotor. Further, phase windings C and C' may be arranged together to induce rotation of the rotor.

Referring now to FIG. 3B, a cross section of a portion of an alternative stator 350 for electric motor 104 is shown. In this example, stator 350 includes a plurality of slots 355 for an increased number of poles. Slots 355 are shown being wrapped with windings A, A', B, B', C, and C'. The slots of stator 350 are arranged closer together than slots 399 of FIG. 3A so that a greater number of poles may be provided. Each of the windings A, A', B, B', C, and C' may occupy two slots (not shown) to provide two poles for each winding.

Thus, the system of FIGS. 1-3B provides for an electric machine, comprising: a stator; windings for one or more electric power phases wrapping the stator, the windings being segmented into a first half and a second half, windings included in the first half not electrically coupled to windings included in the second half. The electric machine includes where the one or more electric power phases is a single electric power phase. The electric machine includes where the one or more electric power phases is three electric power phases. The electric machine includes where the windings include a winding for a first electric power phase in the first half, a winding for a second electric power phase in the first half, a winding for a third electric power phase in the first half, a winding for a first electric power phase in the second half, a winding for a second electric power phase in the second half, and a winding for a third power phase in the second half. The electric machine includes where the winding for the first electric power phase in the first half is positioned in a first slot of the stator, and where the winding of the first electric power phase in the second half is positioned in the first slot of the stator. The electric machine includes where the winding for the second electric power phase in the first half is positioned in a second slot of the stator, and where the winding of the second electric power phase in the second half is positioned in the second slot of the stator. The electric machine includes where the winding for the third electric power phase in the first half is positioned in a third slot of the stator, and where the winding of the third electric power phase in the second half is positioned in the third slot of the stator.

The system of FIGS. 1-3B also provides for an electric system, comprising: a stator; windings for one or more electric power phases wrapping the stator, the windings being segmented into a first half and a second half, windings included in the first half not electrically coupled to windings included in the second half; a first inverter electrically coupled to the windings included in the first half; and a second inverter electrically coupled to the windings included in the second half. The electric system further comprises a first switch to selectively couple the first inverter to a power source. The electric system further comprises a second switch to selectively couple the second inverter to the power source. The electric system further comprises a controller including executable instructions to operate the first and second inverters to supply electric power to the windings. The electric system further comprises additional instructions to open the first switch in response to an indication of degradation of the electric system.

Referring now to FIG. 4, a space vector hexagon for the dual segmented motor shown in FIGS. 2-3B is shown. The space vector hexagon is shown having six states (100, 110, 010, 011, 001, and 101) that may have non-zero magnitudes. There are also two states with zero magnitude (000 and 111). The states identify the status of transistors or switches in an inverter. For example, state 100 indicates that transistor 250 of inverter 202 is on, transistor 254 of inverter 202 is off, and transistor 258 of inverter 202 is off. Similarly, state 010 indicates that transistor 250 of inverter 202 is off, transistor 254 of inverter 202 is on, and transistor 258 of inverter 202 is off, and so on. Since electric motor 104 has segmented windings, state 100 also indicates that transistor 262 of inverter 204 is on, transistor 266 of inverter 204 is off, and transistor 270 of inverter 204 is off. Similarly, state 010 indicates that transistor 262 of inverter 204 is off, transistor 266 of inverter 204 is on, and transistor 270 of inverter 204 is off, and so on.

The length of vectors v1 (dashed line) and v2 (solid line) indicate the voltages that may be applied to the terminals of motor 104. The inverter switching sequence for the inverter transistors may be controlled to generate voltage vectors of varying magnitude and direction of pulse width modulation periods that may drive the inverters. The switching sequences may provide a continuously rotating space vector.

Referring now to FIG. 5, a block diagram for one half of a field oriented control scheme 500 for a dual segmented motor is shown. Field oriented control scheme 500 may be implemented as executable instructions in non-transitory memory of controller 15 shown in FIG. 1.

In this example, inverter 202 is driven via signals generated by field oriented control scheme 500. The field oriented control scheme 500 adjusts phase commands Va, Vb, and Vc in response to a reference electric machine speed. Field oriented control scheme 500 includes several proportional/integral controllers that are identified by PI. Signal summing junctions are indicated as 502 and electric current supplied to electric motor 104 is sensed via electric current sensors 505. Transforms and inverse transforms for converting time domain signals into a rotating reference frame are provided in blocks 508, 511, and 510. Block 509 may generate pulse width modulation (PWM) signals for commanding inverter 202. A position and speed estimate for motor 104 may be generated via block 514. A similar field oriented control scheme may be provided for second inverter 204.

Referring now to FIG. 6, an example method for operating a dual segmented motor is shown. Method 600 may be at least partially implemented as executable instructions stored in controller memory in the system of FIG. 1. Further, method 600 may include actions taken in the physical world to transform an operating state of the system of FIGS. 1-3B.

At 602, method 600 determines system operating conditions. System operating conditions may include, but are not limited to driver demand torque/power, vehicle speed, steering angle, motor speed, motor position, and ambient temperature. Method 600 proceeds to 604.

At 604, method 600 judges if operation of a dual segmented motor is requested. Operation of the dual segmented motor may be requested via a human/machine interface or based on conditions as determined via a controller. If method 600 judges that operation of the dual segmented motor is requested, the answer is yes and method 600 proceeds to 606. Otherwise, the answer is no and method 600 proceeds to 604.

At 604, method 600 deactivates first and second inverters via opening two switches (e.g., switches 203 and 205 of FIG. 2). By opening the two switches, electric power may not be delivered to the dual segmented motor (e.g., 104) included in the dual segmented motor drive 106. Method 600 proceeds to exit.

At 606, method 600 judges if degradation of a dual segmented motor drive is present. Degradation of the dual segmented motor drive may be present within one or both inverters or within a dual segmented motor. In one example, method 600 may judge that degradation of the dual segmented motor drive is present if an electrical current is not at an expected level. Thus, if electric current that is delivered to the motor is greater than is expected, method 600 may judge that the dual segmented motor drive is degraded. In addition, method 600 may judge that degradation of the dual segmented motor drive is present if less than an expected amount of electric current is supplied to the motor. In still other examples, dual segmented motor drive degradation may be based on other conditions such as but not limited to inverter temperature, motor temperature, and motor speed.

The dual segmented motor drive may include a first group of windings and a second group of windings for a motor. If current supplied to one or more phase windings (e.g., A-C or A'-C') is less than or greater than expected, method 600 may judge that the inverter and/or windings that are associated with the higher or lower electric current may be degraded. In this way, method 600 may differentiate which portion of the dual segmented motor drive may be degraded.

If method 600 judges that degradation of the dual segmented motor drive is present, the answer is yes and method 600 proceeds to 612. Otherwise, the answer is no and method 600 proceeds to 608.

At 612, method 600 opens a switch that is associated with the windings and/or inverter that is determined to be degraded. For example, if electrical current supplied to winding A is less than expected, then switch 203 may be opened so that first inverter 202 and windings A-C may be deactivated. On the other hand, if electrical current supplied to winding C' is less than expected, then switch 205 may be opened so that second inverter 204 and windings A'-C' may be deactivated. Method 600 proceeds to 614.

At 614, method 600 continues to supply electric power to the inverter other than the inverter with the switch that has been opened. By continuing to supply power to the other inverter and windings, the dual segmented motor may continue to rotate, thereby allowing a system to continue to operate. Method 600 proceeds to 616.

At 616, method 600 indicates degradation of the inverter or motor that was determined to be receiving less than or greater than an expected amount of current. Method 600 may provide the indication via a visual or audible means (e.g., a human/machine interface). Method 600 returns to 602.

At 608, method 600 activates first and second inverters (e.g., 202 and 204) via closing two switches (e.g., 203 and 205) to allow power to flow to the two inverters. Method 600 proceeds to 610.

At 610, method 600 delivers three phase electric power to two different sets of windings of a motor. The three phase power may be provided via pulse width modulating signals that operate transistors of first and second inverters via a field oriented control scheme as shown in FIG. 5. For example, three phase power may be supplied to phases A, B, and C of a motor via a first inverter. Additionally, three phase power may be supplied to phases A', B', and C' of the motor via a second inverter. The voltage (e.g., magnitude and phase of the voltage) of phase A windings may be aligned with the voltage of phase A' windings, the voltage of phase B windings may be aligned with the voltage of phase B' windings, and the voltage of phase C windings may be aligned with the voltage of phase C' windings.

In other examples, where the motor is a single phase motor, single phase electric power may be delivered to single phase windings of a single phase motor via two sets of windings. Thus, the system and method described herein is not limited to three phase systems. Method 600 returns to 602.

In this way, redundancy to operation of a motor may be provided without the additional mass of a second motor. Further, system cost and complexity may be reduced.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other motor hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the motor control system, where the described actions are carried out by executing the instructions in a system including the various motor hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to vehicle systems, manufacturing systems, process systems, and transportation systems that include different types of actuators including different types of motors and actuators. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric machine, comprising:
a stator;
windings for one or more electric power phases wrapping the stator, the windings being segmented into a first half and a second half, windings included in the first half not electrically coupled to windings included in the second half, where the windings include a winding for a first electric power phase in the first half, a winding for a second electric power phase in the first half, a winding for a third electric power phase in the first half, a winding for a first electric power phase in the second half, a winding for a second electric power phase in the second half, and a winding for a third power phase in the second half.

2. The electric machine of claim 1, where the one or more electric power phases is a single electric power phase.

3. The electric machine of claim 2, where the one or more electric power phases is three electric power phases.

4. The electric machine of claim 1, where the winding for the first electric power phase in the first half is positioned in a first slot of the stator, and where the winding of the first electric power phase in the second half is positioned in the first slot of the stator.

5. The electric machine of claim 4, where the winding for the second electric power phase in the first half is positioned in a second slot of the stator, and where the winding of the second electric power phase in the second half is positioned in the second slot of the stator.

6. The electric machine of claim 5, where the winding for the third electric power phase in the first half is positioned in a third slot of the stator, and where the winding of the third electric power phase in the second half is positioned in the third slot of the stator.

7. A method for operating an electric machine, comprising:
supplying electric power to the electric machine via a first group of windings via a first inverter, the first group of windings wrapping a stator of the electric machine;
supplying electric power to the electric machine via a second group of windings via a second inverter, the second group of windings wrapping the stator of the electric machine; and
ceasing to supply electric power to the electric machine via the first group of windings via opening a first switch in response to an indication of degraded operation of the electric machine.

8. The method of claim 7, where supplying electric power to the electric machine via the first group of windings is simultaneous with supplying electric power to the electric machine via the second group of windings.

9. The method of claim 7, where the degraded operation is determined via a current sensor.

10. The method of claim 7, further comprising ceasing to supply electric power to the electric machine via the second group of windings via opening a second switch in response to an indication of degraded operation of the electric machine.

11. The method of claim 7, where supplying electric power to the electric machine via the first group of windings includes pulse width modulating a voltage supplied to the first group of windings.

12. The method of claim 10, where the degraded operation is determined via a current sensor.

13. The method of claim 11, where supplying electric power to the electric machine via the second group of windings includes pulse width modulating a voltage supplied to the second group of windings.

14. An electric system, comprising:
a stator;
windings for one or more electric power phases wrapping the stator, the windings being segmented into a first half and a second half, windings included in the first half not electrically coupled to windings included in the second half;
a first inverter electrically coupled to the windings included in the first half;
a second inverter electrically coupled to the windings included in the second half; and
a controller including executable instructions to operate the first inverter and the second inverter to supply electric power to the windings, and additional instructions to open the first switch in response to an indication of degradation of the electric system.

15. The electric system of claim 14, further comprising a first switch to selectively couple the first inverter to a power source.

16. The electric system of claim 15, further comprising a second switch to selectively couple the second inverter to the power source.

* * * * *